Figure 1:
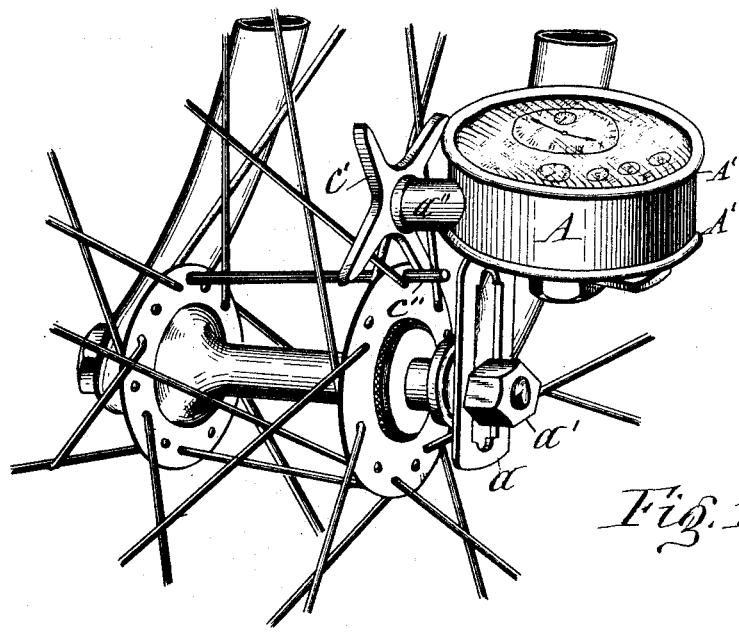

(No Model.) 9 Sheets—Sheet 1.

E. G. DORCHESTER.
SPEED INDICATING AND DISTANCE MEASURING MECHANISM.

No. 587,302. Patented Aug. 3, 1897.

WITNESSES:

INVENTOR:
Edward G. Dorchester
By E. Laass
his ATTORNEY (No Model.) 9 Sheets—Sheet 2.
E. G. DORCHESTER.
SPEED INDICATING AND DISTANCE MEASURING MECHANISM.
No. 587,302. Patented Aug. 3, 1897.

WITNESSES:

INVENTOR:
Edward G. Dorchester
By E. Laass
his ATTORNEY (No Model.)  9 Sheets—Sheet 3.

E. G. DORCHESTER.
SPEED INDICATING AND DISTANCE MEASURING MECHANISM.

No. 587,302.  Patented Aug. 3, 1897.

WITNESSES:

INVENTOR:
Edward G. Dorchester
By E. Laass
his ATTORNEY (No Model.) 9 Sheets—Sheet 4.
E. G. DORCHESTER.
SPEED INDICATING AND DISTANCE MEASURING MECHANISM.
No. 587,302. Patented Aug. 3, 1897.
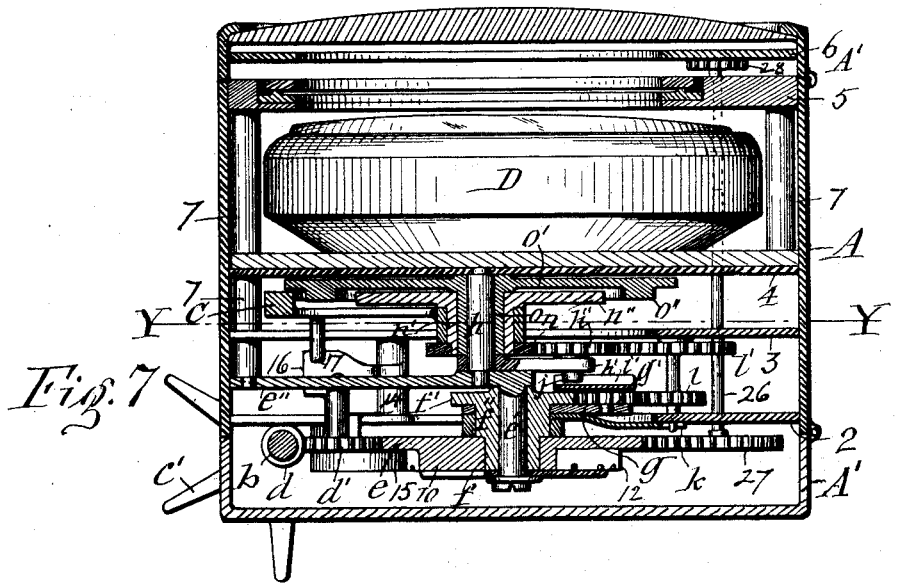
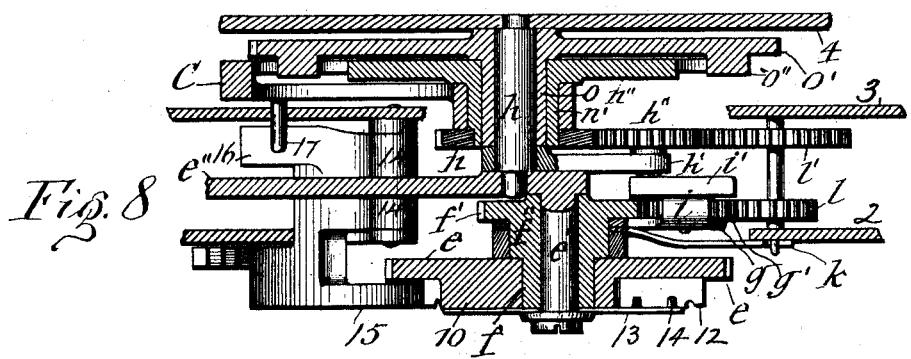
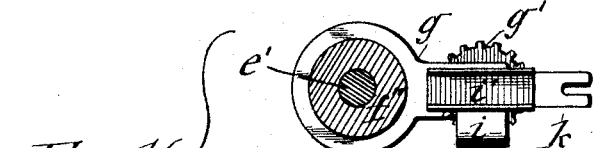
WITNESSES:
INVENTOR:
Edward G. Dorchester
By E. Laass
his ATTORNEY (No Model.) 9 Sheets—Sheet 5.

E. G. DORCHESTER.
SPEED INDICATING AND DISTANCE MEASURING MECHANISM.

No. 587,302. Patented Aug. 3, 1897.

WITNESSES:
INVENTOR:
Edward G. Dorchester
By E. Laass
his ATTORNEYS.

(No Model.) 9 Sheets—Sheet 6.
E. G. DORCHESTER.
SPEED INDICATING AND DISTANCE MEASURING MECHANISM.
No. 587,302. Patented Aug. 3, 1897.

WITNESSES:

INVENTOR:
Edward G. Dorchester
By E. Laass
his ATTORNEYS.

(No Model.) 9 Sheets—Sheet 7.
E. G. DORCHESTER.
SPEED INDICATING AND DISTANCE MEASURING MECHANISM.
No. 587,302. Patented Aug. 3, 1897.
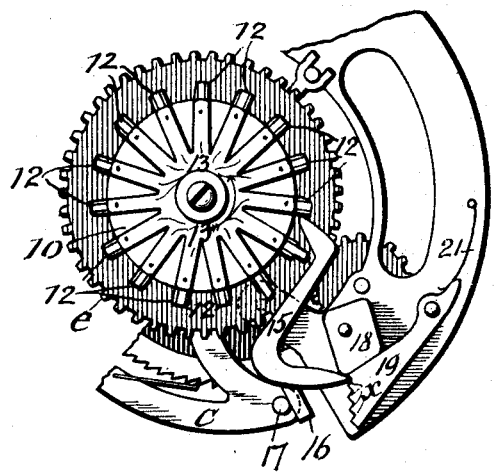
Fig. 13
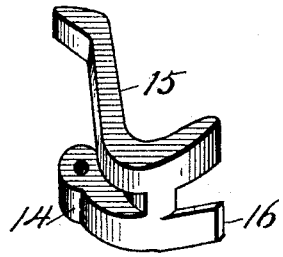
Fig. 14
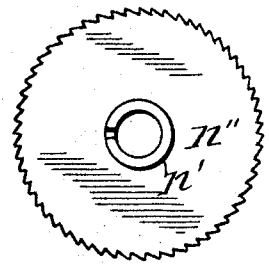
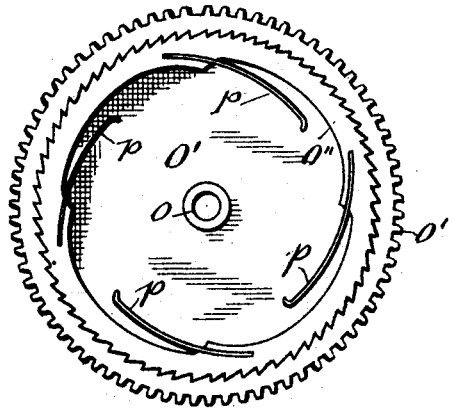
Fig. 15
WITNESSES:
O. E. Tomlinson
C. L. Bendixon
INVENTOR:
Edward G. Dorchester
By E. Laass
his ATTORNEYS.

(No Model.) 9 Sheets—Sheet 8.

E. G. DORCHESTER.
SPEED INDICATING AND DISTANCE MEASURING MECHANISM.

No. 587,302. Patented Aug. 3, 1897.

WITNESSES:

INVENTOR:
Edward G. Dorchester
By E. Lass
his ATTORNEY (No Model.) 9 Sheets—Sheet 9.

E. G. DORCHESTER.
SPEED INDICATING AND DISTANCE MEASURING MECHANISM.

No. 587,302. Patented Aug. 3, 1897.

WITNESSES:

INVENTOR:
Edward G. Dorchester
By E. Laass
his ATTORNEY

THE NORRIS PETERS CO., PHOTO-LITHO., WASHINGTON, D. C.

UNITED STATES PATENT OFFICE.

EDWARD G. DORCHESTER, OF GENEVA, NEW YORK.

SPEED-INDICATING AND DISTANCE-MEASURING MECHANISM.

SPECIFICATION forming part of Letters Patent No. 587,302, dated August 3, 1897.

Application filed February 23, 1895. Renewed November 4, 1896. Serial No. 611,074. (No model.)

*To all whom it may concern:*

Be it known that I, EDWARD G. DORCHESTER, of Geneva, in the county of Ontario, in the State of New York, have invented new and useful Improvements in Timing Instruments, of which the following, taken in connection with the accompanying drawings, is a full, clear, and exact description.

The object of this invention is to provide a compact, convenient, and efficient instrument for accurately determining the speed of a vehicle or velocity of the moving part of a machine, which instrument I elect to designate a "pacer" or "timing instrument," and when to be applied to a vehicle designed to travel over a road of unmeasured distances I combine with said pacer an odometer actuated by the mechanism of said pacer.

When the pacer is designed to be used only for timing a bicycle or sulky on a race-course of a known length, the odometer may be dispensed with.

The pacer is to be used in connection with a chronometer operating independently of the pacer mechanism, and by comparing the movements of the hands of said chronometer with the movements of the pacer-indicators the rider of the vehicle is apprised of any deviations of the speed of the vehicle from the time designed to be made by it.

The invention is fully illustrated in the annexed drawings, in which—

Figure 2:
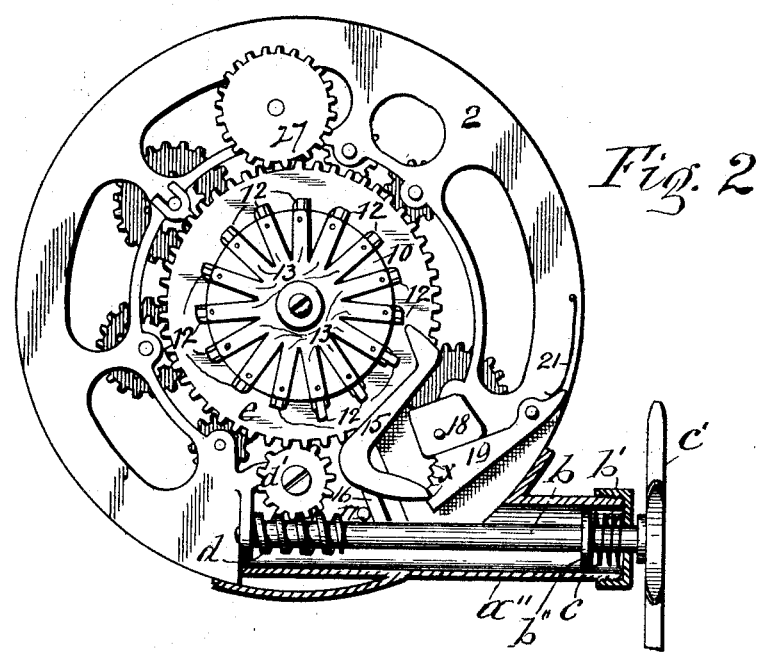
Figure 4:
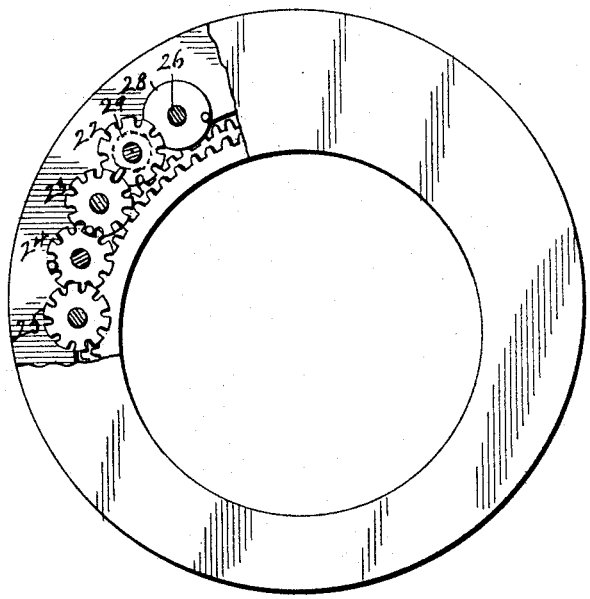
Figure 3:
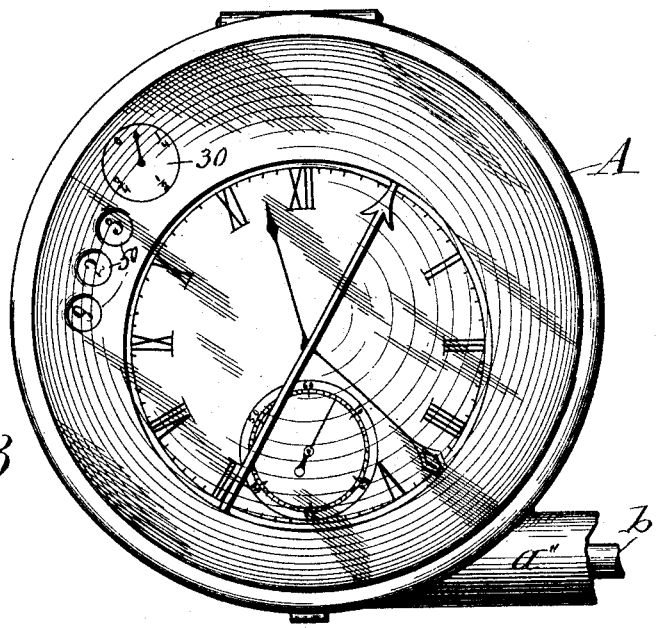
Figure 5:
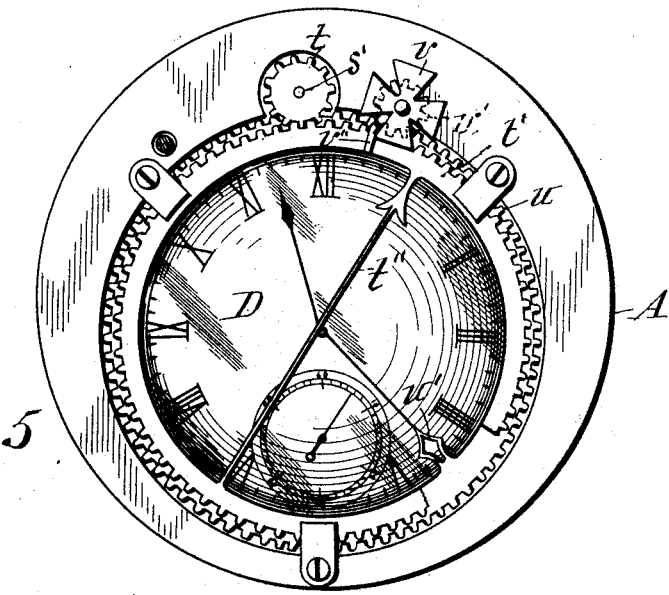
Figure 6:
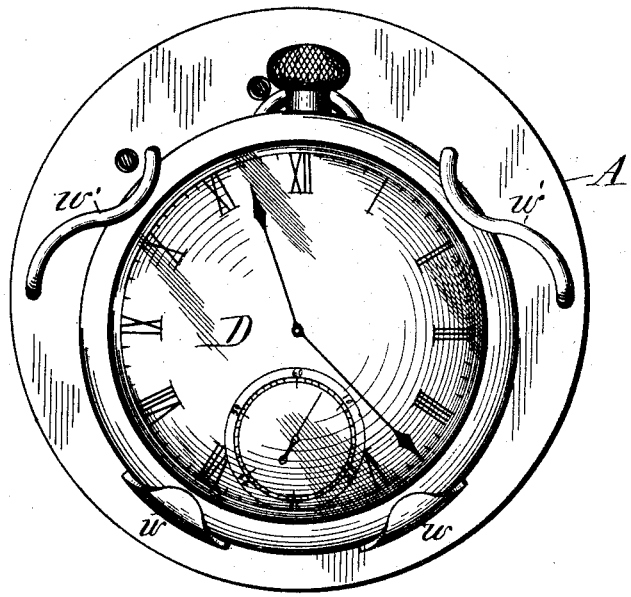
Figure 9:
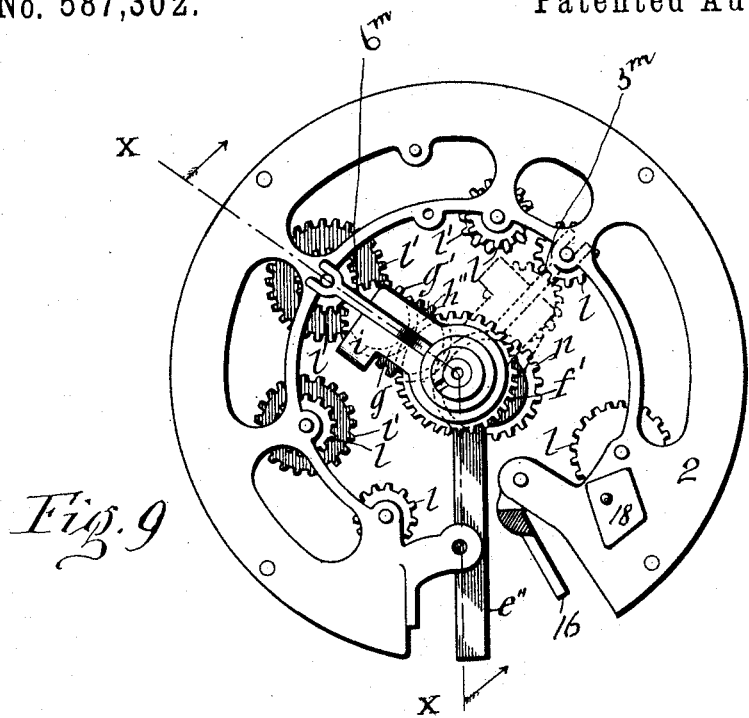
Figure 10:
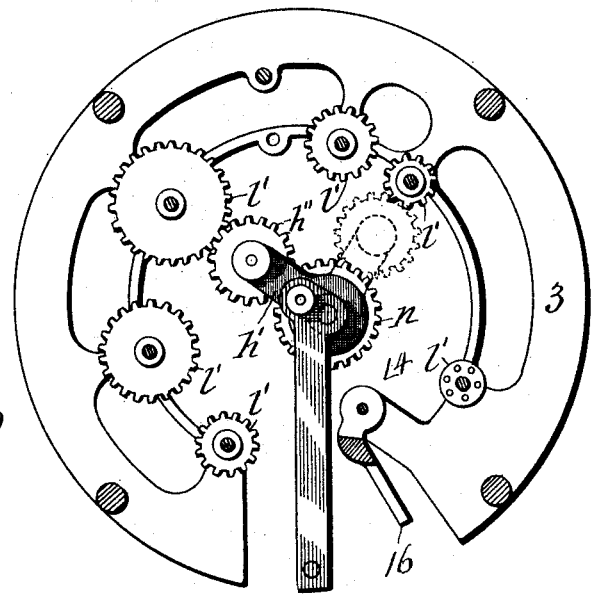
Figure 11:
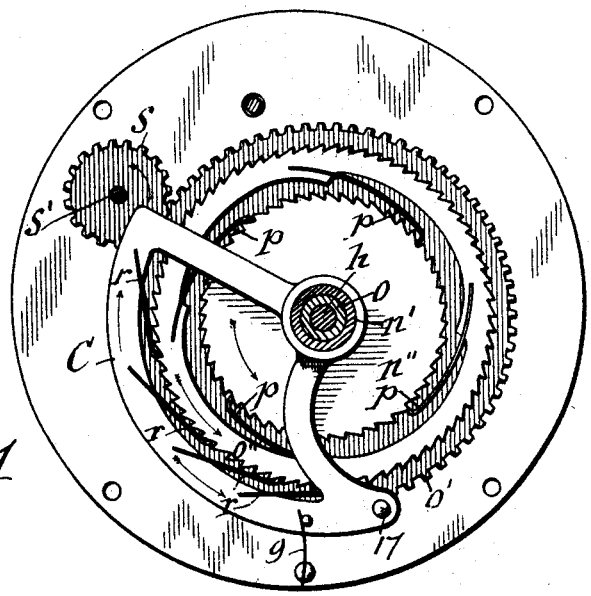
Figure 12:
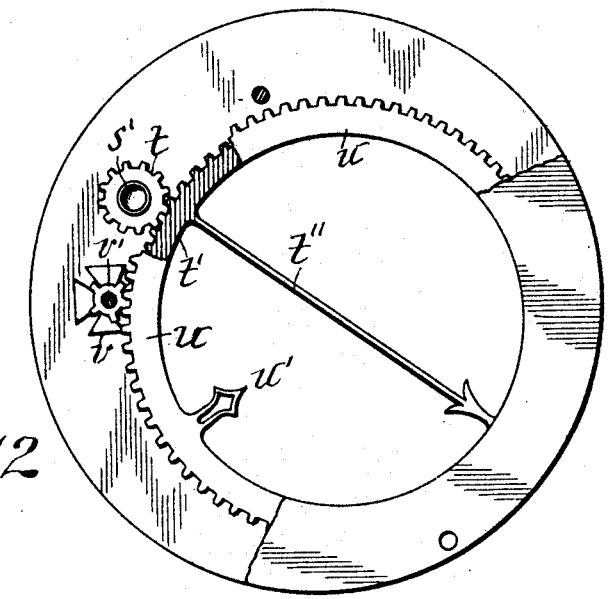
Figure 17:
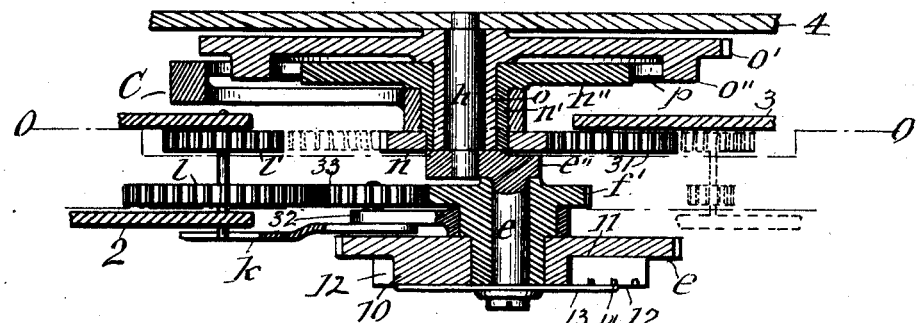
Figure 18:
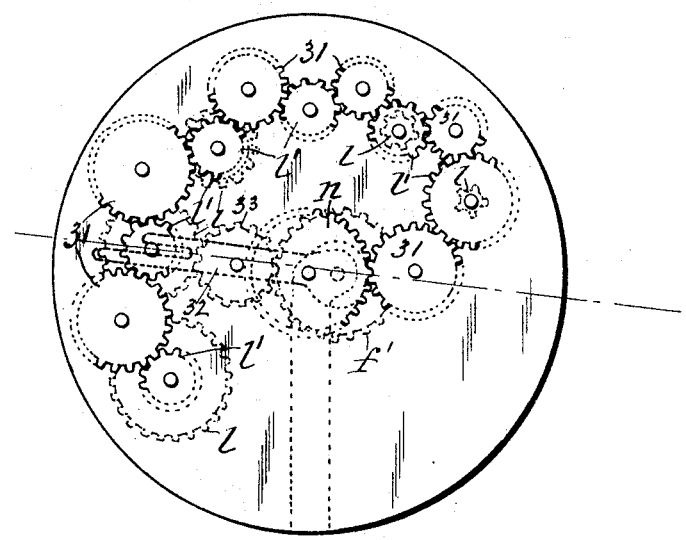
Figure 19:
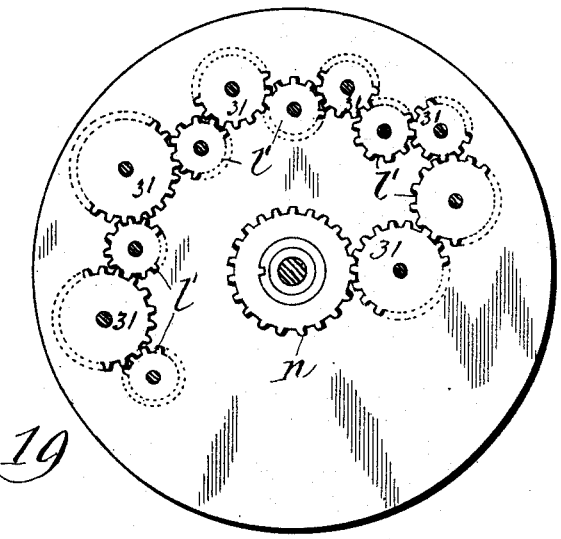
Figure 20:
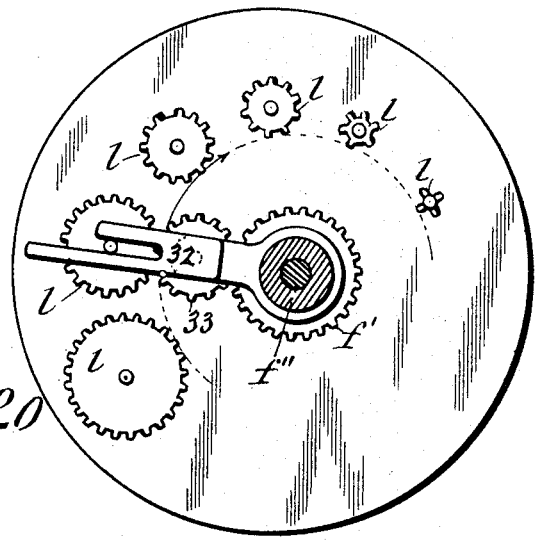

Figure 1 is a perspective view of the attachment of the instrument to a bicycle. Fig. 2 is an inverted plan view of the instrument, taken immediately at the bottom of the interior of the case. Fig. 3 is a top plan view of the instrument. Fig. 4 is a plan view of the odometer mechanism. Fig. 5 is a plan view of the time-indicators of the pacer. Fig. 6 is a plan view of the attachment of the chronometer. Fig. 7 is a transverse section of the pacer, taken on line X X in Fig. 9, including the inclosing case and viewed in the direction indicated by arrows in said figure. Fig. 8 is an enlarged transverse section of the pacer mechanism. Fig. 9 is a plan view of the lower diaphragm, to which the twin gears are pivoted. Fig. 10 is a horizontal transverse section of the twin gears, viewed toward the top of the instrument. Fig. 11 is a horizontal transverse section on line Y Y in Fig. 7, viewed toward the top. Fig. 12 is an inverted plan view of the racks to which the time-indicators are attached, viewed from the under side and portions broken away. Fig. 13 is a plan view of the tumbler, set for indicating forty-seven seconds. Fig. 14 is a detached perspective view of said tumbler. Fig. 15 shows detached plan views of the two ratchet-wheels of the instrument. Fig. 16 shows detached plan views of the two swinging arms which carry the pinions by which the motion of the timing mechanism is regulated. Fig. 17 is a vertical transverse section of a modification of my invention. Fig. 18 is a horizontal transverse section on line O O in Fig. 17; and Figs. 19 and 20 are separate diagrammatic views of the two sets of gears formed by the twin gears, with the means for transmitting motion from the same.

Similar letters and figures of reference indicate corresponding parts.

A represents the case which incloses the mechanism of the instrument, said mechanism being mounted on a frame and composed of diaphragms 2, 3, 4, 5, and 6, secured together by intermediate posts 7 7 and seated in the case. This case is to be provided with suitable means for firmly securing it to a rigid part of the vehicle or machine the speed of which is to be ascertained. For attaching it to a bicycle I affix to said case a longitudinally-slotted arm $a$, which straddles the end of the axle of the front wheel and is clamped thereon by a nut $a'$, applied to the axle, as shown in Fig. 1 of the drawings.

From the side of the case projects a sleeve $a''$, through which passes a shaft $b$, journaled in a cap $b'$, screwed onto the outer end of the sleeve. A spiral spring $c$, surrounding the shaft within the sleeve and bearing with opposite ends on the cap $b'$ and on a collar $b''$, attached to the shaft, forces the shaft longitudinally to its inner bearing and thereby prevents the shaft from rattling. To the outer end of said shaft is fastened a star-wheel $c'$, which is in a position to be struck, and thus intermittently rotated by a pin $c''$, secured to the front wheel of the bicycle. Said star-wheel constitutes the pulsator of the instrument.

The inner end of the shaft $b$ is formed with a worm or spiral thread $d$, which engages a pinion $d'$, pivoted to the diaphragm 2. This pinion meshes with the main gear-wheel $e$, which is mounted on the square end portion of a hub $f$ on a gear-wheel $f'$, pivoted to a gudgeon $e'$, projecting from an arm $e''$, secured between the diaphragms 2 and 3. The aforesaid hub is formed with a cylindrical portion $f''$, adjacent to the wheel $f'$, and on this portion of the hub is pivoted an arm $g$, which extends beyond the periphery of the main gear-wheel $e$ to render said arm accessible by the fingers of the operator for swinging it on its pivot for the purpose hereinafter explained. On this arm is pivoted a pinion $g'$, which meshes with the gear-wheel $f'$.

The inner end of the arm $e''$ is secured to the partition or diaphragm 4 of the frame by a post $h$, projecting from the arm in opposite directions from the gudgeon $e'$ and disposed eccentric in relation thereto, as shown in Figs. 7 and 8 of the drawings.

On the post $h$ is pivoted an arm $h'$, to the free end of which is pivoted a pinion $h''$ for the purpose hereinafter explained.

To compel the arm $h'$ to travel with the arm $g$, I attach to the latter a yoke $i$, which is provided with a radial groove or guide $i'$, as shown in Fig. 16 of the drawings, in which groove is fitted to slide longitudinally the small hub $j$, surrounding the pivot of the pinion $h''$. The groove $i'$ is required to permit the aforesaid sliding movement of the hub caused by the two arms $h'$ and $g$ swinging on different centers.

Between the diaphragms 2 and 3 and pivoted thereto is a series of twin-gears $l\ l'$, arranged in a circle concentric to the gear-wheel $f'$ and forming two sets of gears in parallel planes. The gears $l'$ of one set are of different diameters and are so arranged as to allow the arm $h'$ to be swung on its pivot and cause its pinion $h''$ to engage either of the gears $l'$, the other arm $g$ being at the same time swung on its pivot to cause its pinion $g'$ to mesh with the twin $l$ of the engaged gear $l'$.

By shifting the arm $h'$ so as to carry its pinion $h''$ out of engagement with one gear $l'$ into engagement with another gear $l'$ of a greater or smaller diameter the speed of transmission of motion is varied accordingly.

To hold the pinion $h''$ in engagement with the gear $l'$, the arm $g$ is provided with a spring-latch $k$, which is slotted longitudinally to straddle the lower end of the shaft of the twin gear, which shaft protrudes through the diaphragm 2.

The pinion $h''$ is in constant engagement with a gear-wheel $n$, which is fastened to a hub $n'$, projecting from the center of a ratchet-wheel $n''$, which hub is tubular and receives through it another tubular hub $o$, projecting from the center of a wheel $o'$ and pivoted to the before-referred-to post $h$, as more clearly shown in Figs. 7, 8, and 15 of the drawings. Said wheel has integral with it or securely fastened to it an annular rim $o''$, projecting from the side of said wheel and of such a diameter internally as to receive in it the ratchet-wheel $n''$.

To the rim $o''$ are secured spring-pawls $p\ p$, engaging the ratchet-wheel $n''$ to partake motion therefrom. The exterior of the rim $o''$ is formed with ratchet-teeth pitched in opposite direction from the pitch of the teeth of the ratchet-wheel $n''$, for the purpose hereinafter explained.

The wheel $o'$ is provided with cogs on its periphery, meshing with a pinion $s$ on the lower end of a shaft $s'$, which is pivoted to the diaphragms 4 and 5, and has attached to its upper end a pinion $t$, which engages an annular rack $t'$, seated revolubly in a corresponding recess surrounding a circular opening in the diaphragm 5. The rack $t'$ is provided with a suitable pointer or indicator $t''$, which may extend diametrically across the central opening of the rack, as shown. Immediately under the rack $t'$ is a similar annular rack $u$, which is revoluble and receives a slight rotary motion once in every complete revolution of the upper rack $t'$. This intermittent motion of the lower rack is derived from the upper rack by means of two wheels $v$ and $v'$, fixed to a shaft which is pivoted at opposite ends, respectively, to the two diaphragms 5 and 6.

To the rack $t'$, at one point in the periphery thereof, is attached a lug $v''$, which during the revolution of said rack engages the wheel $v$ and imparts a slight rotation to said wheel. The companion wheel $v'$ being moved with the wheel $v$ and engaging the rack $u$ imparts a corresponding impulse to the latter rack. This rack has attached to it a pointer $u'$. The diaphragms 5 and 6 are a sufficient distance apart to admit a chronometer or watch to be placed between them, so as to expose the face of said chronometer through the opening in the upper diaphragm. Said chronometer operates independently of the mechanisms which actuate the indicators $t''$ and $u'$ and is fastened in its position by means of suitable clips $w\ w$ and adjustable clamps $w'\ w'$, attached to the diaphragm 5 and engaging the top of the margins of the chronometer-case, as represented in Fig. 6 of the drawings.

The mechanism thus far described transmits motion from the bicycle or other vehicle or other moving machine to the indicating-racks $t'$ and $u$ at a speed which is varied at will of the user of the instrument by shifting the arm $g$ so as to carry its pinion $g'$ into engagement with twin gears $l'\ l$ of different diameters. In this manner the instrument can be set so as to cause the indicators $t''$ and $u'$ to move in unison, respectively, with the seconds-hand and minute-hand of the chronometer D at a predetermined speed of the vehicle or machine to which the instrument is attached.

By comparing the movements of the indicators $t''$ and $u'$ with the movements of the seconds-hand and minute-hand of the chronometer directly under said indicators it will be readily observed if the vehicle or machine moves at the desired speed.

Figs. 9 and 10 of the drawings show the employment of six twin gears $l\ l'$, adapted to transmit motions to the indicators to indicate speeds of one mile in one to six minutes of time. In order to allow the instrument to be adjusted for still finer or more accurately indicating-speeds, I employ the following auxiliary mechanism: To the hub of the wheel $n''$ is pivoted a sector C, to which are connected spring-pawls $r\ r$, engaging the ratchet-teeth of the rim $o''$ on the gear-wheel $o'$. Said teeth being pitched in opposite direction from the teeth of the ratchet-wheel $n''$ allows the wheel $o'$ to be turned independently of the wheel $n''$ by the spring-pawls $r\ r$ of the sector C when the latter is swung on its pivot from its position of rest, in which position said sector is held, as hereinafter described. In order to insure transmission of motion from the sector C to the wheel $o'$ under different degrees of motion of said sector, I make the pawls $r\ r$, and preferably also the pawls $p\ p$, of varying lengths or graduate them so as to invariably cause one of said pawls to be engaged while the remainder of the pawls are different degrees out of engagement, and caused to successively pick up one tooth at a time.

The sector is actuated to impart motion to the wheel $o'$ by the following mechanisms: To the wheel $e$ is fastened a circular plate 10, which is concentric to said wheel and provided with radially-projecting teeth, preferably fifteen in number, and with a corresponding number of radial grooves 11 extending through said teeth. In each of said grooves is a finger or slide 12, adapted to be drawn out so as to project from the end of the tooth, as illustrated more clearly in Figs. 2, 8, and 13 of the drawings. Said fingers are sustained in the grooves by means of springs 13 13, attached to the plate 10, and provided with pins 14, entering sockets in the fingers 12. To the diaphragms 2 and 3 is pivoted the hub 14 of a tumbler 15, which is attached to the lower end of the hub and extends toward the plate 10 sufficiently to allow the tumbler to be encountered by the teeth of said plate during the rotation of the wheel $e$. To the upper end of the hub 14 is attached a spur 16, against which bears a pin 17, attached to the sector C, pushed toward said pin by a suitable spring 9. (See Fig. 11.) This movement of the sector is limited by an adjustable stop 19, preferably of the form of a latch, pivoted to the diaphragm 2 and provided with a plurality of shoulders or steps X, by which to engage the heel of the tumbler, so as to sustain said tumbler turned into different positions. The said stop or latch is sustained in its various required positions by means of an eccentric 18, pivoted to the diaphragm 2, upon which eccentric the stop 19 is made to rest by a spring 21. In this manner the tumbler can be held out of contact with the teeth and fingers of the plate 10, and thus the indicator $t'$ is only moved to indicate a certain number of minutes per mile traveled. By setting the stop 19 so as to allow the tumbler 15 to engage the fixed teeth of the plate 10 said tumbler receives fifteen oscillations during each revolution of the wheel $e$, and by the engagement of the spur 16 of the tumbler with the sector C the latter, with the aid of the spring $g$, receives a corresponding number of oscillations, each stroke of which causes one of the pawls $r$ to engage one of the ratchet-teeth on the wheel $o'$. By drawing out the fingers 12 the thrust of the tumbler is increased and a correspondingly-longer stroke is imparted to the sector C. The mechanism for transmitting motion from the vehicle to the wheel $e$ is so timed as to cause said wheel to make three revolutions during the travel of a mile by the vehicle to which the instrument is attached. Hence if the tumbler 15 is set to engage the fifteen fixed teeth of the plate 10, the sector C receives forty-five oscillations during the travel of a mile by the vehicle, each oscillation representing one second. The number of oscillations, however, can be varied by setting the tumbler 15 so as to keep it out of contact with the fixed teeth of the plate 10 and engage only such of the fingers 12 which are drawn out to project from the ends of the fixed teeth. In this manner the sector C can be made to oscillate a greater or less number of times during the travel of a mile by the vehicle. Said teeth and fingers of the plate 10 are employed only for moving the indicator $t''$ in advance of the impulses imparted to said indicator by the hereinbefore-described train of gears, which are so timed as to cause the indicator to indicate a certain number of minutes according to the adjustment of the arm $g$, which carries the pinion $g'$ into engagement with the twin gears $l$.

The operation of the described pacer or timing instrument is as follows: Assuming the rider of the bicycle or sulky wishes to time himself to run a mile in six minutes and three seconds, then the arm $g$ is to be swung on its pivot to carry its pinion $g'$ into engagement with the twin gears $l$ at "$6^{\mathrm{m}}$," as shown by full lines in Figs. 9 and 10 of the drawings, and then three of the fingers 12 are to be drawn out, so as to project from the fixed teeth of the plate 10, as represented in Fig. 2 of the drawings. The vehicle being then set in motion causes the star-wheel $c'$ to receive intermittent rotary motion from the wheel of the vehicle, which motion is transmitted to the wheel $e$ and thence through the described train of gears and intermediate ratchet-wheels and pawls to the indicator-rack $t'$, which transmitting mechanism causes said rack to move a distance of six minutes on the dial of the chronometer D. This movement of the indicator, however, is accelerated by the impulses imparted to the sector C by the engagement of the tumbler 15 with the projecting ends of the three fingers 12, drawn out as aforesaid. This acceleration causes the indicator $t'$ to move an additional distance of three seconds on the dial of the chronometer. Therefore the rider of the vehicle is enabled to observe if he is riding at the desired speed.

To further explain the operation of the pacer or timing instrument, I will assume that the rider of the vehicle wishes to time himself to travel one mile in three minutes and forty-seven seconds. Then the arm $g$ is to be turned to bring its pinion $g'$ into engagement with the twin gears $l$ at the point marked $3^m$, as indicated by dotted lines in Fig. 9 of the drawings, and two of the fingers 12 are drawn out to project beyond the plate 10, and then the latch or stop 19 is to be set so as to allow the tumbler to engage the fixed teeth of said plate, and consequently also engage the projecting fingers. The vehicle being then set in motion causes the indicator $t'$ to move a distance of three minutes on the dial of the chronometer. The three rotations of the plate 10 with the wheel $e$ impart forty-five impulses to the tumbler 15 and the increased thrusts from the two projecting fingers 12, together with said forty-five impulses, move the indicators $t'$ and $u''$ forty-seven seconds in addition to the movement received from the gear-wheel $e$ through the medium of the train of gears and intermediate ratchet-wheels, as before described.

The described pacer or timing instrument is more specially designed to be used on tracks of known lengths, so that the rider of the vehicle is always apprised of the distance traveled by him. In order to permit said pacer or timing instrument to be used on roads which are without means of showing distances, I connect to said instrument a suitable odometer, which in this case is represented of the form of a train of registering-wheels 22, 23, and 24, geared together so as to cause a complete revolution of each to impart a tenth of a revolution to the next succeeding wheel in the usual and well-known manner, not necessary to be here illustrated. The first of said wheels has attached to it a pointer moving over a dial 30, marked consecutively from a fraction of a mile to one mile, and the succeeding wheels 23 and 24 have attached to them dials marked from "0" to "9" and placed back of the front or top plate of the case A, which is provided with apertures 25, through which to expose one of the numbers of each of said dials. The said train of registering-wheels receives motion from a shaft 26, having on opposite ends pinions 27 and 28, meshing, respectively, with the wheel $e$ and the pinion 29 on the axis of the indicating-wheel 22.

To afford access to the mechanism in the case A when required, I form said case with hinged or removable end sections or caps $A'A'$.

I do not wish to be limited to the employment of the two arms $g$ and $h'$, with their pinions $g'$ and $h''$, in connection with the twin gears $l\,l'$, for transmitting motion from the gear-wheel $f'$ to the wheels $n$ and $o'$, as hereinbefore described, inasmuch as said mechanism is susceptible of modifications, as shown, for instance, in Figs. 19 and 20 of the drawings, in which all the twin gears are caused to simultaneously turn on their axes by means of intermediate pinions 31 of various diameters and forming, with the gears $l'$ of the twins, a train of gears leading from the gear-wheel $n$, as shown in Fig. 19 of the drawings. In connection with said train of gears a single arm 32 is employed, which arm is pivoted to the hub $f'''$ of the wheel $f'$, as shown in Fig. 20 of the drawings. To said arm is pivoted a pinion 33, which meshes with the wheel $f'$ and with the gear $l$ of the twins to which the arm 32 is set. By swinging said arm to bring its pinion 33 in mesh with gears $l$ of different diameters the speed of the wheel $n$ is varied to impart to the indicator $t'$ the desired motion, as hereinbefore described.

What I claim as my invention is—

1. A timing instrument, embodying a pulsator to be actuated by the vehicle or machine to be timed, a time-indicator, and mechanism transmitting motion from the pulsator to the indicator, said mechanism containing a set of gears of different diameters mounted on different shafts arranged around a common center, an arm pivoted at one end, and a pinion journaled on the free end of said arm and carried thereby into engagement with any one of said gears, substantially as described and for the purposes specified.

2. In a timing instrument, the combination of a pulsator to be actuated by the vehicle or machine to be timed, a time-indicator, and mechanism transmitting motion from the pulsator to the indicator, said mechanism containing two sets of gears disposed concentric to a common center and in different planes, and two pinions, each mounted on the free end of a pivoted arm and in the planes of the aforesaid sets of gears, so as to be swung into engagement with any one of the gears of their respective sets, substantially as described.

3. In a timing instrument, the combination with the shaft receiving intermittent motion from the machine or vehicle to be timed, and a time-indicator geared therewith, of a sector connected with the indicator, a tumbler connected with the sector, and adjustable fingers to be engaged by said tumbler, substantially as described.

4. In a timing instrument, the combination with the pulsator to be actuated by the machine or vehicle to be timed, and a time-indicator geared therewith, of a sector, a ratchet-and-pawl mechanism connecting the sector with the indicator, a revoluble plate provided with teeth, fingers adjustable thereupon, and a tumbler to engage said fingers, said tumbler having connection with the sector.

5. A timing instrument embodying a shaft to which intermittent motion is to be communicated from the vehicle or machine to be timed, a time-indicator, and gearing connecting the indicator with the shaft, said gearing having an accelerating means for the purpose specified.

6. A timing instrument consisting of an inclosing case, a clamp for securing said case to the vehicle, a shaft extending from the interior of the case, a star-wheel attached to the outer end of said shaft and actuated at intervals by the wheel of the vehicle, a main gear-wheel in one end of the case receiving motion from said shaft, revoluble time-indicators in the opposite end of the case, gears in said end of the case actuating said indicators, a series of twin gears of different diameters arranged between the aforesaid gears, an arm swinging about the axis of one of the latter gears, and pinions carried by said arm to transmit motion from the main gear-wheel to the gears in the opposite end of the case through the medium of the twin gears as set forth.

7. In combination with two gear-wheels mounted on axes extending in opposite directions and eccentric in relation to each other, twin gears forming two sets of gears disposed in circles respectively around the axes of the aforesaid gear-wheels and in parallel planes between said wheels, the gears of one set being of varying diameters, two arms swinging about the axes of the eccentrically-pivoted gear-wheels, a pinion pivoted to one of said arms and transmitting motion from one of the eccentrically-pivoted gear-wheels to one of the twin gears, and a pinion pivoted to the other of the aforesaid arms and transmitting motion from said twin gears to the second eccentrically-pivoted gear-wheel, said swinging arms being connected together by a radially-movable coupling to allow said arms to swing in unison as set forth.

8. The combination of the gear-wheel $f'$, provided with a hub having cylindrical and square portions, the main gear $e$ mounted on said squared portion, means for driving said main gear from a moving part of the vehicle or machine to be timed, an accessible arm pivoted on the cylindrical part of said hub, a pinion $g'$ mounted on the free end of said arm and meshing with said gear-wheel $f'$, a pivoted arm $h'$ coupled with said arm $g'$ and movable in unison therewith, a pinion $h''$ on the free end of said arm $h'$, a series of twin gears arranged concentric with respect to said gear $f'$, the gears of one of said sets being of different diameters and arranged to be engaged one at a time by said pinion $h^2$, and the gears of the other set being arranged to be engaged one at a time by said pinion $g'$, an indicator, and gearing between the indicator and the upper of the twin gears.

9. A timing instrument consisting of a case attached to the vehicle, a shaft extending from the interior of said case and actuated by the wheel of the vehicle, a gear-wheel pivoted to the interior of the case and receiving motion from the aforesaid shaft, a revoluble rack in the case carrying a seconds-indicating hand, a revoluble minute-indicating rack concentric with the aforesaid rack, a train of gears transmitting motion from the aforesaid gear-wheel to the rack carrying the seconds-indicator, a lug on the latter rack, a star-wheel actuated by said lug, and a pinion attached to the shaft of said star-wheel and meshing with the minute-indicating rack as set forth.

10. The combination of the case A provided with means for attaching it to the vehicle, the shaft $b$ pivoted to said case and provided with the worm $d$ on its inner end, the star-wheel $c'$ attached to the outer end of said shaft, the fixed arm $e''$ having the gudgeon $e'$ and post $h$ extending from opposite sides of the arm and eccentrically in relation to each other, the gear-wheel $f'$ pivoted to the gudgeon $e'$, the gear-wheel $e$ fastened to the wheel $f'$, the pinion $d'$ transmitting motion from the worm to the wheel $e$, the gear-wheel $o'$ pivoted to the post $h$ and provided with the ratchet-rim $o''$, the ratchet-wheel $n''$ pivoted to the hub of the wheel $o'$, pawls $p\ p$ attached to the wheel $n''$ and engaging the aforesaid ratchet-rim, the gear-wheel $n$ fastened to the hub of said ratchet-wheel, the arms $g$ and $h'$ pivoted respectively to the aforesaid gudgeon and post, the pinions $g'$ and $h''$ pivoted respectively to the arms $g$ and $h'$ and meshing with the wheels $f'$ and $n$, the yoke $i$ attached to the arm $g$ and provided with a radial groove, a hub on the arm $h'$ sliding in said groove, a series of twin gears $l\ l'$ forming two sets of gears arranged in circles to permit the pinions $g'$ and $h''$ to be thrown into engagement therewith by the swinging of the arms $g$ and $h'$, the revoluble rack $t'$ provided with the pointer $t''$ and the shaft $s'$ having affixed to opposite ends the pinions $s$ and $t$ meshing respectively with the gear-wheel $o'$ and rack $t'$ substantially as described and shown.

11. A timing instrument consisting of a case sustained on the vehicle to be timed, a revoluble time-indicator in said case, a combined ratchet and gear wheel transmitting motion to said indicator, a shaft extending from the case, a wheel on said shaft receiving motion from the wheel of the vehicle, a train of gears receiving motion from said shaft, a pawl-and-ratchet mechanism transmitting motion from said train of gears to the combined ratchet and gear wheel, a circular plate moving with the main gear-wheel and provided with teeth on its periphery, a tumbler pivoted in the case and adjustable to and from the path of the teeth of the aforesaid plate and a pawl actuated by the tumbler and moving the aforesaid combined ratchet and gear wheel independent of the train of gears as set forth.

12. In combination with the main gear-wheel $e$, ratchet-wheel $n''$ and train of gears transmitting motion from said main gear-wheel to the ratchet-wheel, the wheel $o'$ provided with the ratchet-rim $o''$, pawls $p$ attached to the wheel $o'$ and engaging the ratchet-wheel $n''$ to transmit motion to the wheel $o'$, the indicator $t''$ receiving motion from the latter wheel, the oscillatory sector C having pawls $r$ engaging the ratchet-rim $o''$, the tumbler 15 and spring 9 actuating said sector, the plate 10 secured to the wheel $e$, and the fingers 12 connected to said plate adjustably in a radial direction, as and for the purpose set forth.

13. In combination with the main gear-wheel $e$ and the ratchet-wheel $n''$ receiving motion from said gear-wheel, the wheel $o'$ provided with the ratchet-rim $o''$, pawls $p$ attached to the latter wheel and transmitting motion thereto from the wheel $n''$, the indicator $t''$ receiving motion from the wheel $o'$, the oscillatory sector C having pawls $r$ engaging the ratchet-rim $o''$, the tumbler 15 and spring 9 actuating said sector, the adjustable stop 19 limiting the movement of the tumbler, the plate 10 moving with the wheel $e$ and provided with teeth on its periphery, and the fingers 12 supported radially adjustable on said plate as set forth.

14. In combination with the main gear $e$, ratchet-wheel $n''$ receiving motion from said gear, and the wheel $o'$ provided with the ratchet-rim $o''$ and the pawls $p$ transmitting motion from the ratchet-wheel $n''$ to the wheel $o'$, the sector C provided with pawls $r$ engaging the aforesaid ratchet-rim, the tumbler 15 engaging the sector, the pivoted stop 19 limiting the motion of the tumbler, the eccentric 18 supporting the said stop, a spring holding the stop engaged with the eccentric, the spring 9 holding the sector in its position of rest, the plate 10 moving with the gear $e$ and fingers 12 supported radially adjustable on said plate as set forth.

15. In combination with the gear-wheel $e$ and tumbler 15, the plate 10 provided with radial grooves, the fingers 12 in said grooves, and the springs 13 sustaining said fingers in the grooves as set forth.

16. The combination of a ratchet-wheel $n''$, a sector pivoted to the hub thereof and carrying spring-pawls, a wheel $o'$ having a rim, pawls projecting from said rim and engaging said ratchet-wheel, said rim having ratchet-teeth pitched in direction opposite those of the ratchet-wheel, and engaged by the pawls of said sector, an indicator, and connections between said wheel $o'$ and indicator.

17. The combination of a ratchet-wheel $n''$, a wheel $o'$ having ratchet-teeth, pawls attached to said wheel $o'$ and engaging said wheel $n''$, an oscillatory sector having spring-pawls of different length, designed to engage the ratchet-teeth of wheel $o'$, and means for operating said sector, constructed to impart variable impulses thereto, and an indicator connected with said wheel $o'$.

18. In combination with the gear-wheels $f''$ and $n$ and the twin gears $l\ l'$, the arm $g$ carrying pinion $g'$ and the spring-latch $k$ attached to said arm and slotted longitudinally to straddle the end of the shaft of the twin gear as set forth.

19. The combination with the gear-wheel $o'$ having ratchet-teeth, and the indicator connected therewith, of a pivoted sector, spring-pawls projecting therefrom into engagement with said ratchet-teeth, said pawls being of varying lengths, a tumbler for actuating said sector, and means for actuating said tumbler constructed to vary the thrust of the same.

20. The combination with the gear-wheel $o'$ having ratchet-teeth, and the indicator connected therewith, of a pivoted sector, spring-pawls projecting from the same into engagement with said ratchet-teeth, a revoluble plate 10 having radially-projecting grooved teeth, an adjustable finger in each of the grooves of the teeth, and a pivoted tumbler encountered by the teeth of said plate, said tumbler actuating the sector, substantially as described.

21. In combination with the wheel $e$, revoluble time-indicators and mechanism transmitting motion from said wheel to the indicators and including the independently-revoluble wheel $o$, segment C having ratchet-and-pawl connection with the latter wheel, the tumbler actuating said segment, and a wheel, fastened to the hub of the first-mentioned wheel and provided with teeth, and radially-movable fingers on said wheel, substantially as described.

In testimony whereof I have hereunto signed my name this 31st day of January, 1895.

EDWARD G. DORCHESTER. [L. S.]

Witnesses:
J. J. LAASS,
C. L. BENDIXON.